July 24, 1962 F. KELLNER 3,045,550
TELESCOPING TELEPHOTO LENS
Filed Sept. 28, 1959
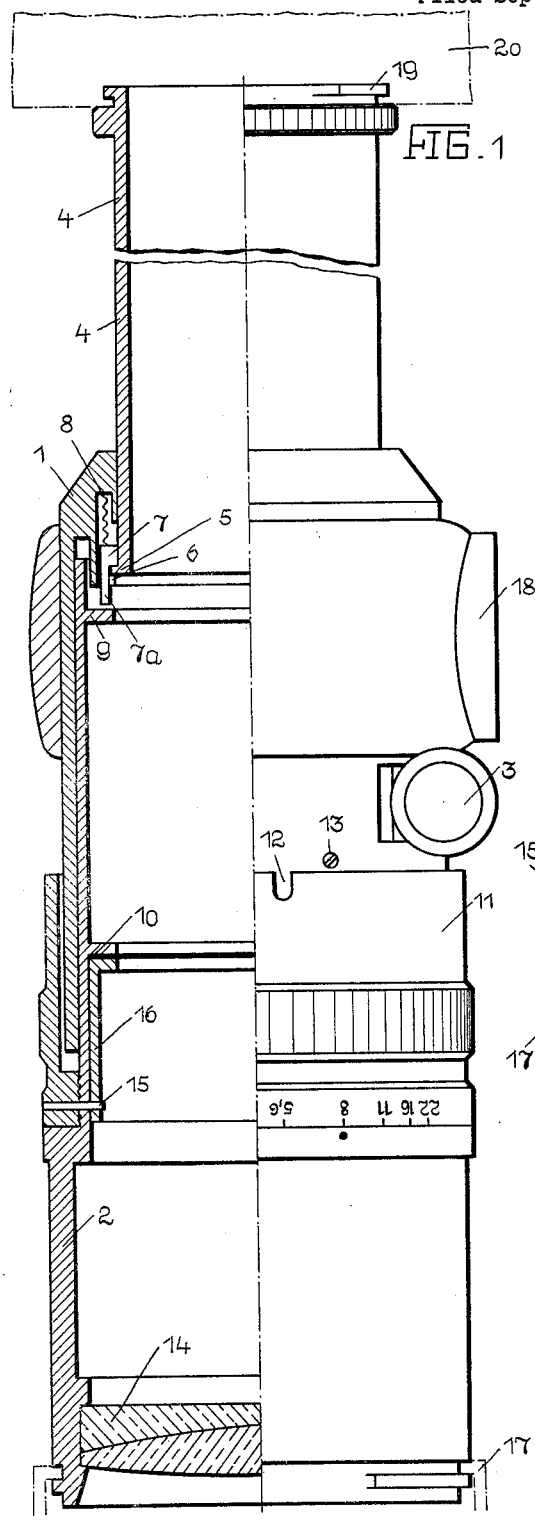
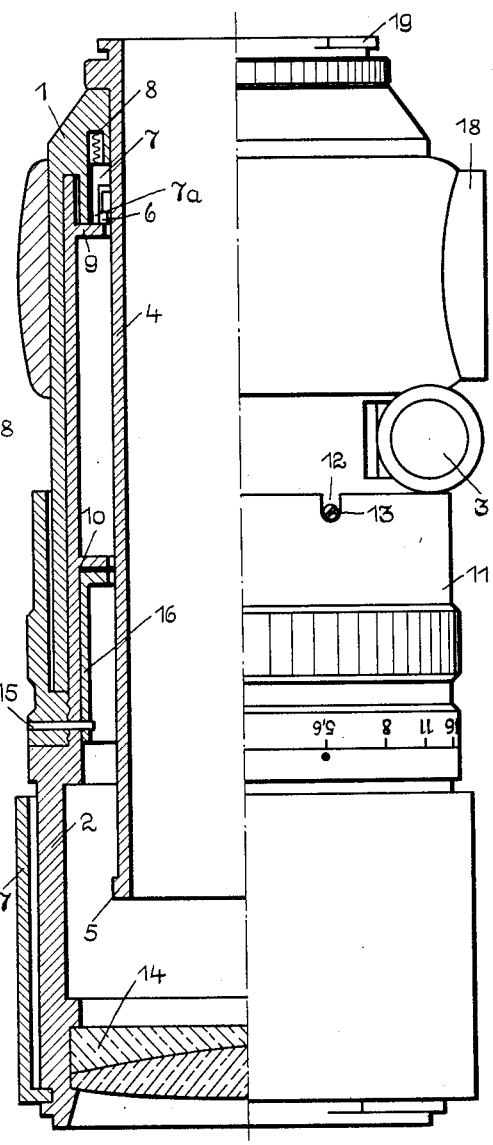
INVENTOR
Ferdinand Kellner
BY
Michael S. Striker
ATTORNEY United States Patent Office 3,045,550
Patented July 24, 1962

3,045,550
TELESCOPING TELEPHOTO LENS
Ferdinand Kellner, Buxach, near Memmingen, Bavaria, Germany, assignor to Novoflex Fotogerätebau Karl Muller, Amendingen, near Memmingen, Germany
Filed Sept. 28, 1959, Ser. No. 842,640
Claims priority, application Germany Sept. 27, 1958
4 Claims. (Cl. 88—57)

The present invention relates to improvements in telephoto lenses.

It is a well-known fact that, in telephoto lenses, the actual length of the lens is always slightly greater than its focal length. Although such telephoto lenses are very desired because of the excellent optical results attainable therewith, they do have one great disadvantage, namely, that they are very long and therefore rather bulky, making it difficult to carry them. Especially in difficult terrain, for example, in the mountains, where such a lens usually has to be carried in a napsack or the like, it is often a question of the space available whether it can be taken along or not.

Numerous efforts have therefore been made prior to this invention to design telephoto lenses handier for being carried by permitting them to be unscrewed into several parts. Although the container in which the lens was stored then became shorter, it usually was so bulky that the advantage attained was very small. Furthermore the rather difficult assembly of the different parts practically nullified the advantage.

It is an object of the present invention to provide a telephoto lens which, in order to be more conveniently carried and stored, is adapted to be reduced considerably in length and has the further advantage of being quickly adjusted so as to be ready for immediate use.

This object is attained according to the invention by dividing the lens into several parts at a very particular point, namely, closely behind the center of the total length of the lens, and so as to permit the thinner rear part of the lens to be telescoped into the front part.

Although it is generally known that the parts of telescopes according to the Galilean principle are slidable into each other and also that lenses of a short focal length are often sunk into a camera when not in use, the conditions applicable to these apparatus do not apply to telephoto lenses and are entirely different from those applicable to the latter. In telescopes, there is no iris diaphragm as in telephoto lenses which might interfere with the telescoping of the lens tubes. In short focal lenses, on the other hand, the lens supporting part is sunk together with the iris diaphragm into the inside of the camera, that is, into a chamber of sufficient space. For reducing the size of a telephoto lens, it is advisable to mount the iris diaphragm not directly behind the lenses but still further toward the rear, and it has been found that it may be spaced therefrom as much as 30% of the focal length of the lens without impairing its optical performance. Mounting the iris diaphragm in front of the lens would increase the diameter and weight of the lens head to such an extent that the advantage of telescoping the lens tubes would be nullified.

According to the present invention, the telephoto lens is therefore divided at the point where the path of the rays will not be restricted and where, on the other hand, the inwardly telescoping tube is of a sufficiently small diameter in order to be passed freely through the fully opened iris diaphragm. Since this point is located shortly behind the center of the focal length of the lens, the actual length of the entire lens may be reduced considerably by telescoping the same. In order to prevent any damage to the iris diaphragm by the parts of the bayonet lock on the inner telescoping tube, the invention further provides means for automatically preventing the bayonet lock from being disengaged and the lens tube from being telescoped when the iris diaphragm is not fully opened.

These and additional objects, features, and advantages of the present invention will become further apparent from the following detailed description thereof, particularly when the same is read with reference to the accompanying drawings, in which—

FIGURE 1 shows, partly in cross section, a side view of a telephoto lens according to the invention in the operative position; while FIGURE 2 shows a similar view of the same telephoto lens in the telescoped position and with a sunshade fitted thereon in the reversed position.

Referring to the drawings, the telephoto lens according to the invention comprises a lens body or lens tube 1 within which the lens-supporting lens head 2 is slidable in a straight direction by means of a pinion drive 3. The extension tube or rear tube 4 is mounted with a sliding fit at the rear end of lens body 1 so as to be telescoped into the latter. Its bayonet lock member 5 fits into its counterpart 6 on the lens body 1. A lock member or arresting means 7 which is urged forwardly by a spring 8 locks the bayonet lock in the operative position of the telephoto lens by engaging between the projections of the bayonet member 5. The nose 7a of lock member 7 is disposed opposite to an annular, inwardly projecting web 9 of lens head 2. Bayonet member 5 is made of a diameter sufficiently small so as to permit it to slide easily past the fully opened iris diaphragm 10 when being telescoped. The diaphragm setting ring 11 which is connected to the inner diaphragm sector ring 16 by a pin 15 is provided with a notch 12 into which the projecting head 13 of a setscrew is adapted to fit to lock the setting ring 11 against rotation relative to lens body 1 when the diaphragm is fully opened. Lens 14 is mounted so that, when set to infinity or to a closer distance, the rear edge of setting ring 11 will never engage with the head 13 of the setscrew so that diaphragm 10 may be adjusted at will.

If, after the pictures are taken, the telephoto lens is to be removed from the camera 20 by disengagement of the bayonet lock 19 in order to be stored or carried separately of the camera 20, diaphragm 10 must be opened fully by turning the setting ring 11 until notch 12 is opposite to screw head 13, whereupon lens head 2 may be retracted by the pinion drive 3 to a point beyond the infinity position. Web 9 then acts upon nose 7a of lock member 7 which releases bayonet member 5. After the bayonet lock has been disengaged, tube 4 may then be telescoped completely into lens body 1 and lens head 2.

As indicated in FIGURE 1, lens head 2 is designed to permit a sunshade 17 to be attached to its front end, for example, by means of a bayonet lock. When not in use, sunshade 17 may be reversed, telescoped over lens head 2, and locked thereto, as indicated in FIGURE 2. The telephoto lens is preferably further provided with a supporting ring 18 for mounting the lens on a tripod.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A telephoto lens arrangement comprising, in combination, a lens tube; a diaphragm arranged in said lens tube movable between a closed position and an open position in which latter position said diaphragm has a predetermined diaphragm opening; means for moving said diaphragm between said positions thereof; a rear tube having a cross sectional area smaller than said predetermined diaphragm opening so as to be adapted to move through said diaphragm opening when said diaphragm is in said open position, said rear tube being slidably arranged within said lens tube and movable between an extended position in which it is spaced from said diaphragm and a collapsed position in which it projects partly through said diaphragm opening; locking means operatively connected to said tubes and movable between a locking and a releasing position for preventing in said locking position movement of said rear tube from said extended to said collapsed position; and means interconnecting said means for moving said diaphragm with said locking means to permit movement of said locking means to said releasing position thereof only when said means for moving said diaphragm have moved said diaphragm to said open position thereof.

2. A telephoto lens arrangement comprising, in combination, a lens tube; a diaphragm arranged in said lens tube movable between a closed position and an open position in which latter position said diaphragm has a predetermined diaphragm opening; a rear tube having a cross sectional area smaller than said predetermined diaphragm opening so as to be adapted to move through said diaphragm opening when said diaphragm is in said open position, said rear tube being slidably arranged within said lens tube and movable between an extended position in which it is spaced from said diaphragm and a collapsed position in which it projects partly through said diaphragm opening; locking means operatively connected to said tubes and movable between a locking and a releasing position for preventing in said locking position movement of said rear tube from said extended to said collapsed position; and means permitting said locking means to be moved from said locking to said releasing position only when said diaphragm is in said open position thereof.

3. A telephoto lens arrangement comprising, in combination, a lens tube; a diaphragm arranged in said lens tube movable between a closed position and an open position in which latter position said diaphragm has a predetermined diaphragm opening; means for moving said diaphragm between said positions thereof; a rear tube having a cross sectional area smaller than said predetermined diaphragm opening so as to be adapted to move through said diaphragm opening when said diaphragm is in said open position, said rear tube being slidably arranged within said lens tube and movable between an extended position in which it is spaced from said diaphragm and a collapsed position in which it projects partly through said diaphragm opening; locking means operatively connected to said tubes and movable between a locking and a releasing position for preventing in said locking position movement of said rear tube from said extended to said collapsed position; means preventing movement of said locking means from said locking to said releasing position unless said diaphragm is moved to said open position thereof and comprising means for locking the diaphragm moving means in a position in which the diaphragm is moved to its open position, means for preventing said locking means from being unlocked in the extended position of said rear tube, and means for releasing said last mentioned means when said diaphragm moving means are in said locked position.

4. A telephoto lens arrangement comprising, in combination, a lens tube; an iris diaphragm arranged in said lens tube movable between a closed and an open position in which latter position said diaphragm has a predetermined diaphragm opening; a diaphragm setting ring rotatably mounted on the outer surface of said lens tube for moving said diaphragm between said positions thereof; a rear tube having a cross sectional area smaller than said predetermined diaphragm opening so as to be adapted to move through said diaphragm opening when said diaphragm is in said open position, said rear tube being slidably arranged within said lens tube and movable between an extended position in which it is spaced from said diaphragm and a collapsed position in which it projects partly through said diaphragm opening; a bayonet type locking means having associated lock members on the front end of said rear tube and on the rear end of said lens tube and being movable between a locking and a releasing position for preventing in said locking position movement of said rear tube from said extended to said collapsed position; means for preventing said locking means to move to said releasing position unless said diaphragm is in said open position and comprising associated means on said setting ring and said lens tube for locking said setting ring against rotation when said diaphragm is in said open position, arresting means for preventing said locking means from being unlocked in the extended position of said rear tube, and means for releasing said arresting means when said setting ring is in said locked position and said diaphragm is fully opened.

References Cited in the file of this patent
UNITED STATES PATENTS

| | | |
|---|---|---|
| 1,353,151 | Deming | Sept. 21, 1920 |

FOREIGN PATENTS

| | | |
|---|---|---|
| 213,315 | Germany | Sept. 15, 1909 |
| 910,142 | Germany | Apr. 29, 1954 |